United States Patent
Wang

[11] Patent Number: 5,900,032
[45] Date of Patent: May 4, 1999

[54] AIR CLEANER DEVICE

[76] Inventor: Yin-Jung Wang, 91, Wu Nan Road, Wu Chi, Taichung Hsien, Taiwan

[21] Appl. No.: 09/045,391

[22] Filed: Mar. 20, 1998

[51] Int. Cl.[6] .................................................. B01D 46/10
[52] U.S. Cl. .............................. 55/385.3; 55/414; 55/481; 55/DIG. 28
[58] Field of Search ................................... 55/385.3, 414, 55/481, DIG. 28

[56] References Cited

U.S. PATENT DOCUMENTS

| | | | |
|---|---|---|---|
| 4,326,865 | 4/1982 | Siebels | 55/DIG. 28 |
| 5,004,487 | 4/1991 | Kowalczyk | 55/385.3 |
| 5,494,497 | 2/1996 | Lee | 55/385.3 |
| 5,613,991 | 3/1997 | Esaki et al. | 55/385.3 |
| 5,640,937 | 6/1997 | Slopsema | 55/385.3 |
| 5,730,768 | 3/1998 | Kaminaga et al. | 55/385.3 |
| 5,740,774 | 4/1998 | Kennedy | 55/385.3 |

*Primary Examiner*—Jay H. Woo
*Assistant Examiner*—Minh-Chau T. Pham
*Attorney, Agent, or Firm*—Alan Kamrath

[57] ABSTRACT

An air cleaner device is disposed beside an engine chamber. A connection pipe is connected to the engine chamber and the air cleaner device. The air cleaner device is adjacent to an accumulator. The air cleaner device has a lower box, an upper cover covering the lower box, four clamp devices disposed on four upper corners of the lower box, and a filter device disposed in the lower box. A connection pipe is connected to the upper cover. An air inlet pipe is connected to the lower box. An air activation block is disposed on the filter device. A large number of air passages are formed on the air activation block.

3 Claims, 6 Drawing Sheets

AIR CLEANER DEVICE

BACKGROUND OF THE INVENTION

The present invention relates to an air cleaner device. More particularly, the present invention relates to an air cleaner device which has an energy saving air activation block.

Referring to FIGS. 1 to 3, a conventional air cleaner device 2' is disposed beside an engine chamber 1'. A connection pipe 3' is connected to the engine chamber 1' and the conventional air cleaner device 2'. In general, the conventional air cleaner device 2' is adjacent to an accumulator 4'. The conventional air cleaner device 2' comprises a lower box 7', an upper cover 6' covering the lower box 7', four inner bars 8' disposed in the lower box 7', four clamp devices 14' disposed on four upper corners of the lower box 7', and a filter device 10' disposed in the lower box 7'. A connection pipe 3' is connected to the upper cover 6'. An air inlet pipe 5' is connected to the lower box 7'. The filter device 10' comprises a frame 11', a large number of posts 12' disposed in the frame 11' and a plurality of filteration elements 13' supported by the posts 12'. However, the gasoline in the engine chamber 1' cannot be burned completely.

SUMMARY OF THE INVENTION

An object of the present invention is to provide an air cleaner device which has an energy saving air activation block to activate the air.

Accordingly, an air cleaner device is disposed beside an engine chamber. A connection pipe is connected to the engine chamber and the air cleaner device. The air cleaner device is adjacent to an accumulator. The air cleaner device has a lower box, an upper cover covering the lower box, four clamp devices disposed on four upper corners of the lower box, and a filter device disposed in the lower box. A connection pipe is connected to the upper cover. An air inlet pipe is connected to the lower box. An air activation block is disposed on the filter device. A large number of air passages are formed on the air activation block.

In accordance with a first preferred embodiment of the present invention, an air cleaner device is disposed beside an engine chamber. A connection pipe is connected to the engine chamber and the air cleaner device. The air cleaner device is adjacent to an accumulator. The air cleaner device comprises a lower box, an upper cover covering the lower box, four clamp devices disposed on four upper corners of the lower box, and a filter device disposed in the lower box. A connection pipe is connected to the upper cover. An air inlet pipe is connected to the lower box. An air activation block is disposed on the filter device. A large number of round air passages are formed on the air activation block. The air activation block has an ion exchange function for the air. Therefore, the oxygen amount of the air is increased.

In accordance with a second preferred embodiment of the present invention, an air cleaner device is disposed beside an engine chamber. A connection pipe is connected to the engine chamber and the air cleaner device. The air cleaner device is adjacent to an accumulator. The air cleaner device comprises a lower box, an upper cover covering the lower box, four clamp devices disposed on four upper corners of the lower box, and a filter device disposed in the lower box. A connection pipe is connected to the upper cover. An air inlet pipe is connected to the lower box. An air activation block is disposed on the filter device. A large number of square air passages are formed on the air activation block. The air activation block has an ion exchange function for the air. Therefore, the oxygen amount of the air is increased.

DETAILED DESCRIPTION OF THE INVENTION

Figure 1:
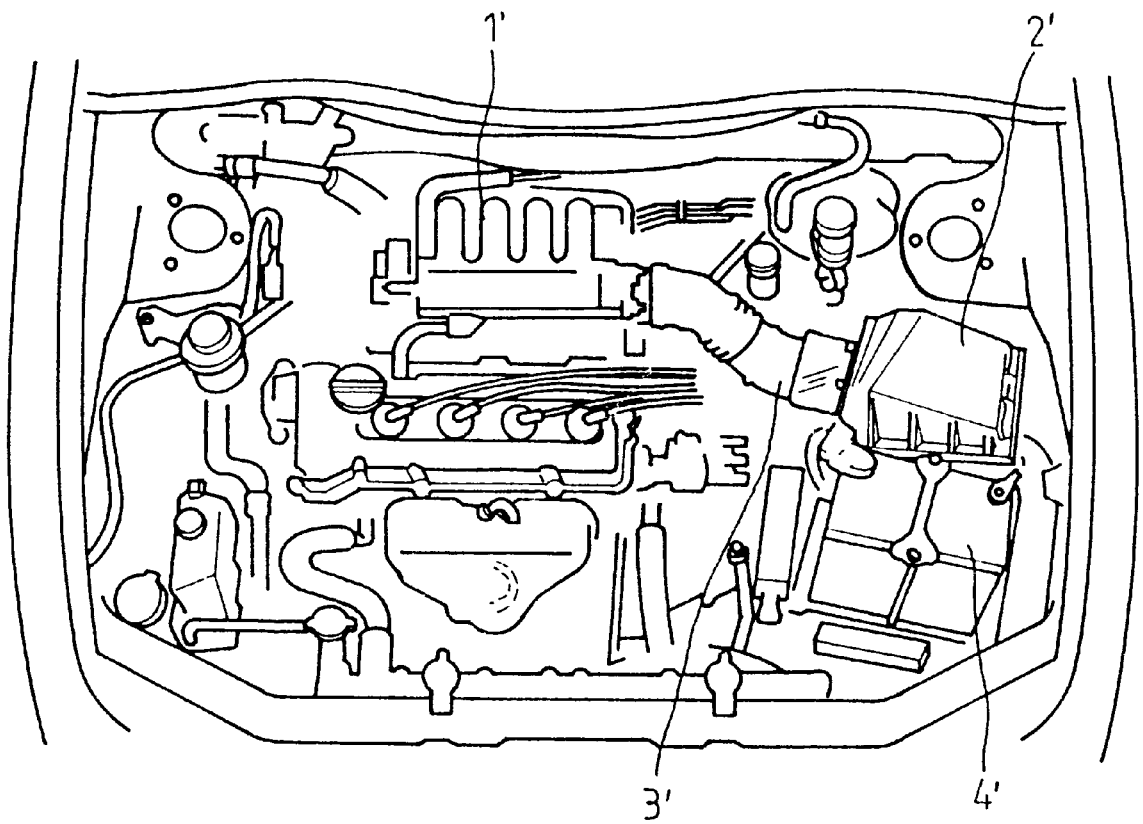
FIG. 1 is a schematic view illustrating a conventional air cleaner device of the prior art disposed in a vehicle.
Figure 2:
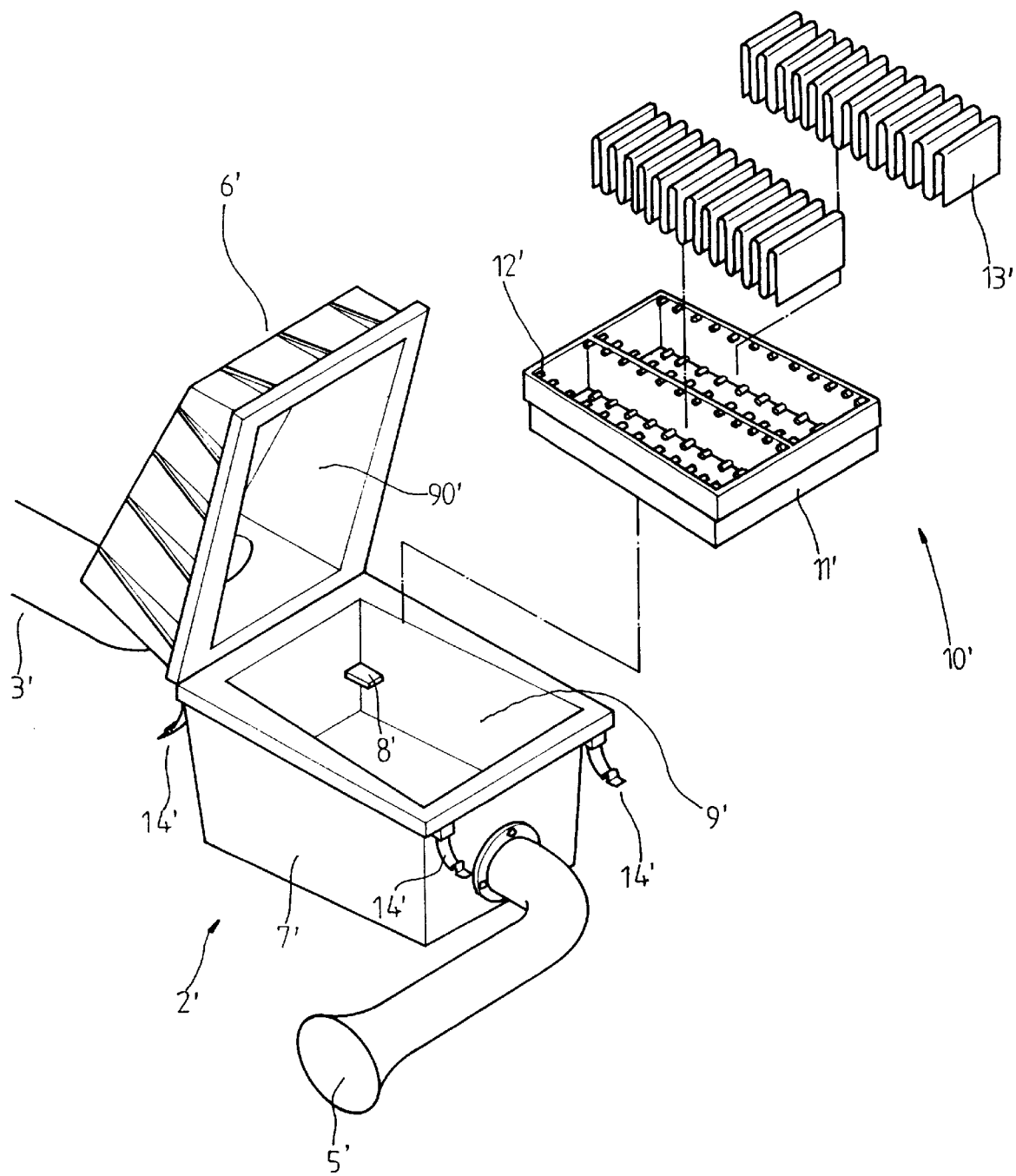
FIG. 2 is a perspective exploded view of a conventional air cleaner device of the prior art.
Figure 3:
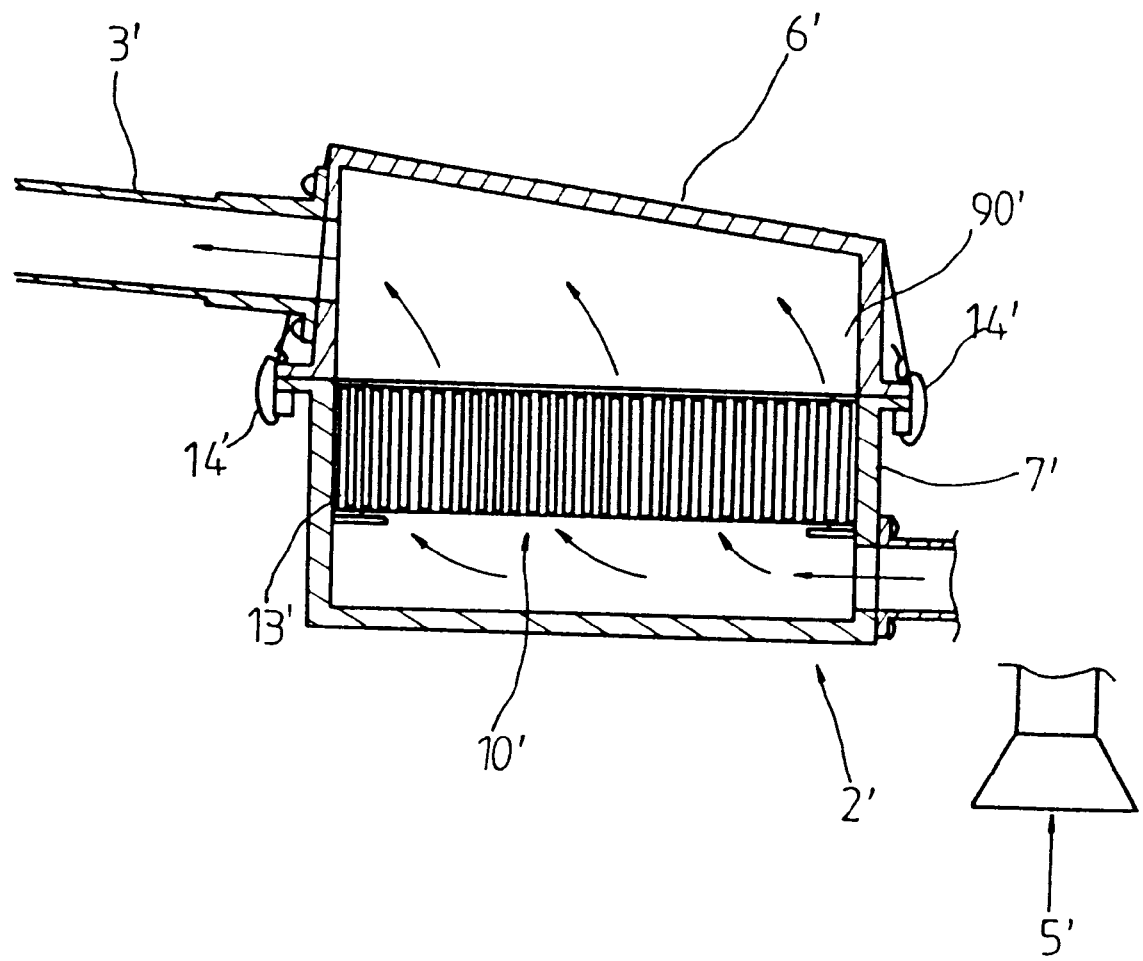
FIG. 3 is a schematic view illustrating a circulation of the air in a conventional air cleaner device of the prior art.
Figure 4:
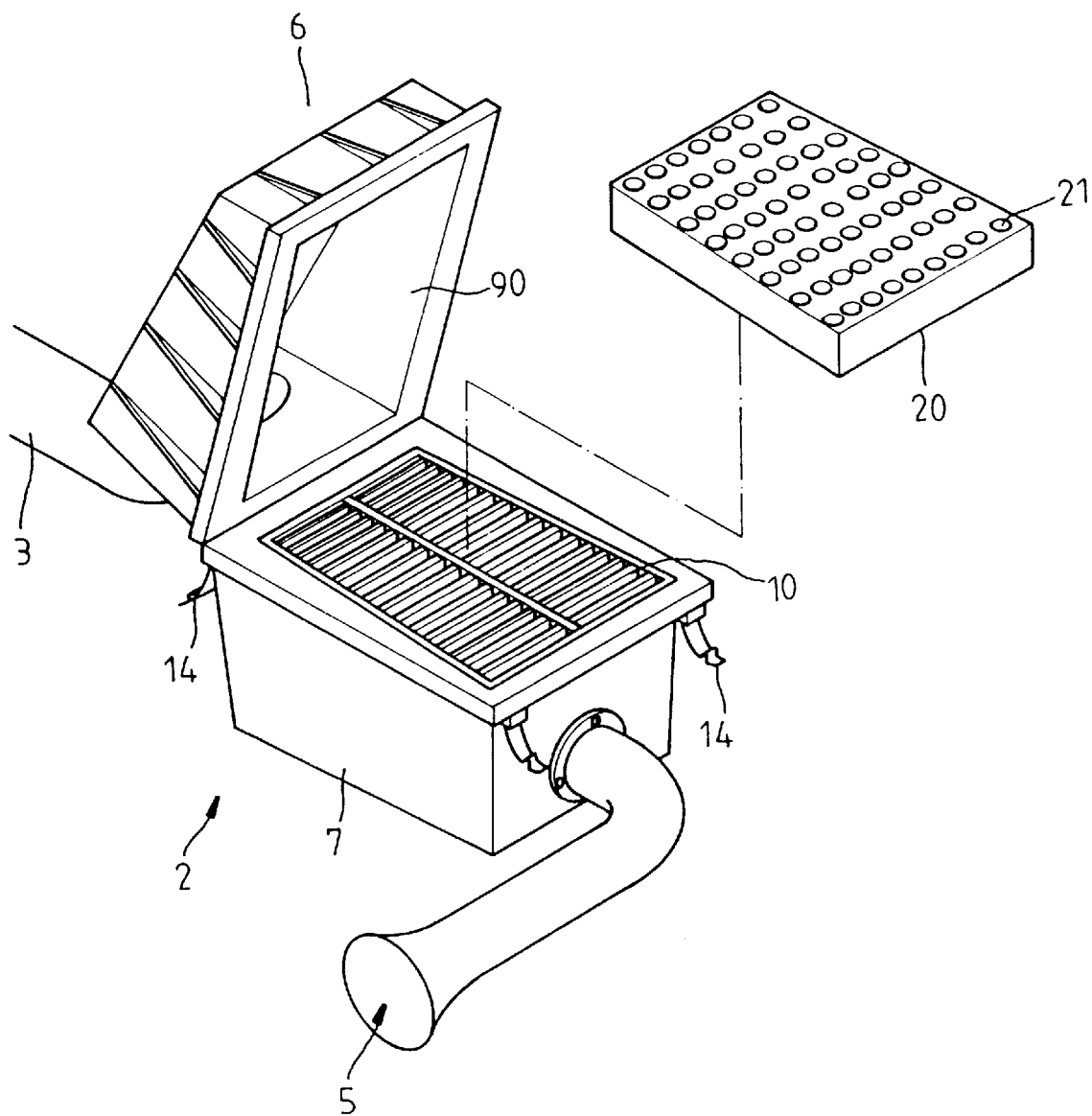
FIG. 4 is a perspective view of an air cleaner device of a first preferred embodiment in accordance with the present invention.
Figure 5:
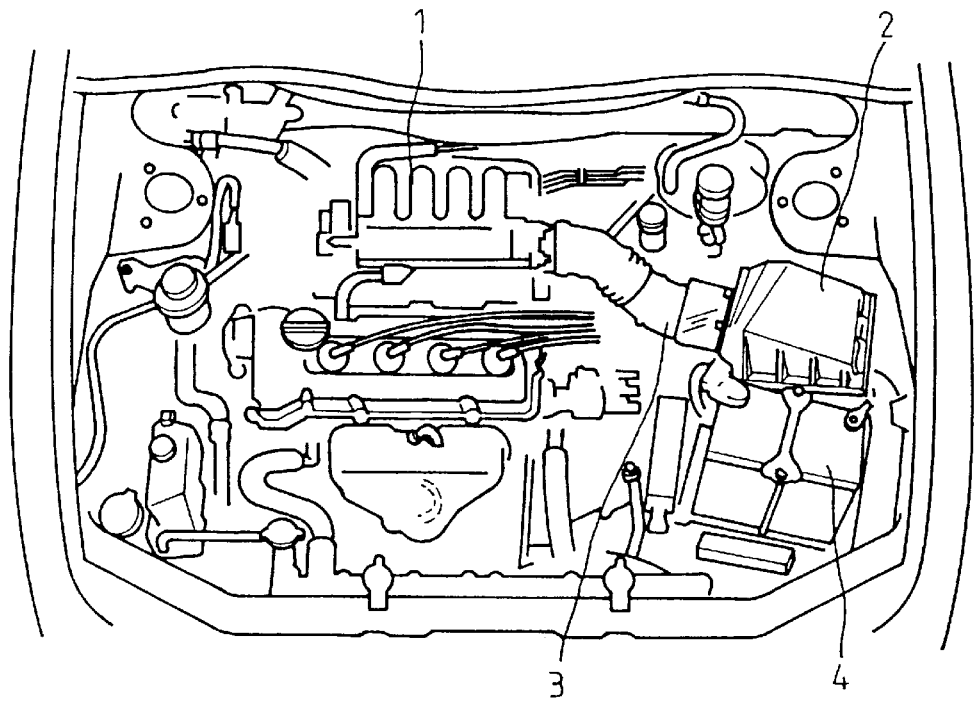
FIG. 5 is a schematic view illustrating an air cleaner device of a first preferred embodiment disposed in a vehicle.
Figure 6:
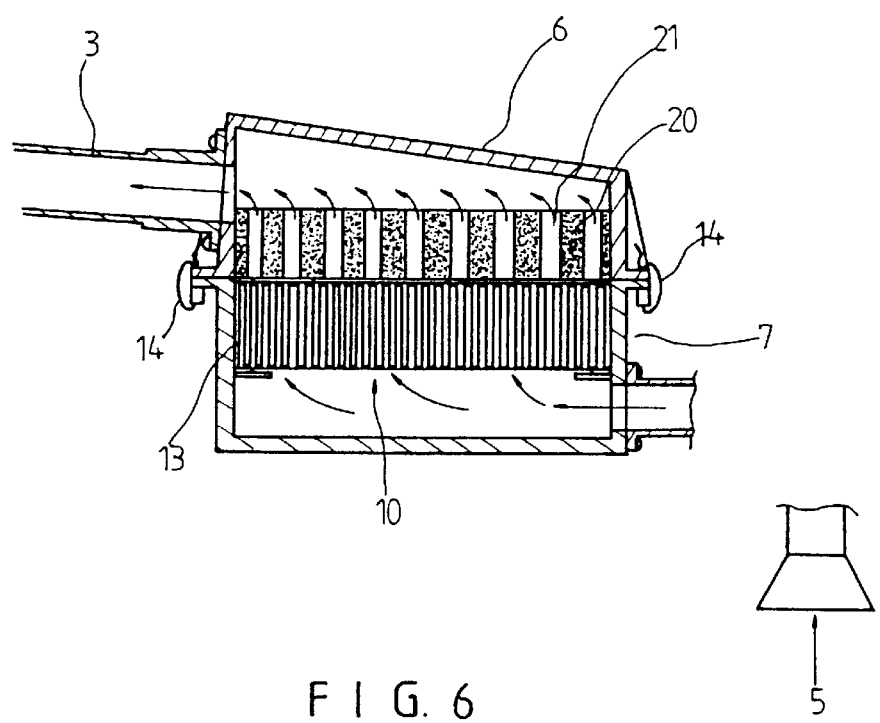
FIG. 6 is a schematic view illustrating a circulation of the air in an air cleaner device of a first preferred embodiment in accordance with the present invention.

Referring to FIGS. 4 to 6, an air cleaner device 2 of a first preferred embodiment of the present invention is disposed beside an engine chamber 1. A connection pipe 3 is connected to the engine chamber 1 and the air cleaner device 2. In general, the air cleaner device 2 is adjacent to an accumulator 4. The air cleaner device 2 comprises a lower box 7, an upper cover 6 covering the lower box 7, four clamp devices 14 disposed on four upper corners of the lower box 7, and a filter device 10 disposed in the lower box 7. A connection pipe 3 is connected to the upper cover 6. An air inlet pipe 5 is connected to the lower box 7. An air activation block 20 is disposed on the filter device 10. A large number of round air passages 21 are formed on the air activation block 20. The air activation block 20 has an ion exchange function for the air. Therefore, the oxygen amount of the air will be increased. The structure of the filter device 10 has been described in the prior art.

Figure 7:
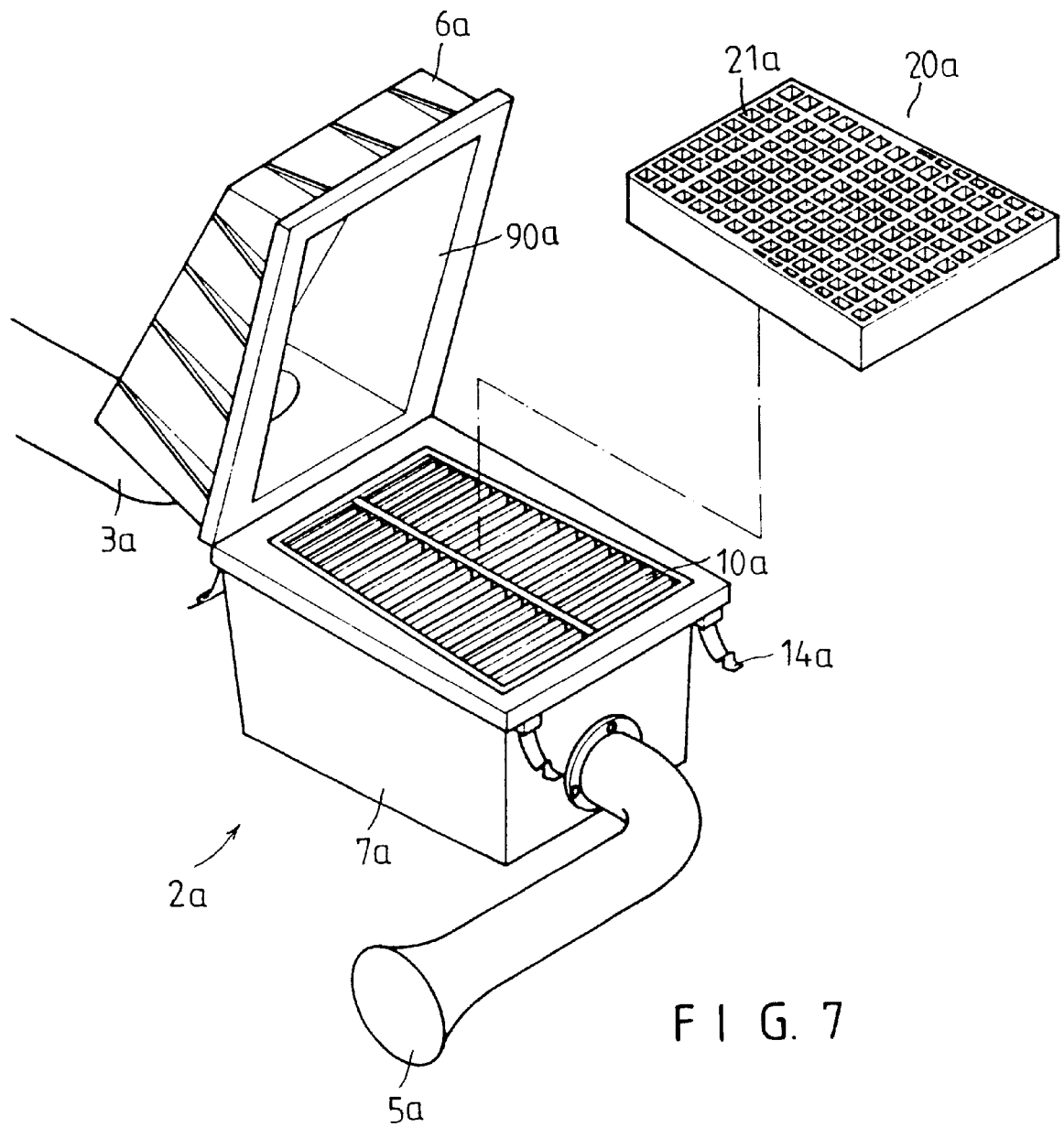
FIG. 7 is a perspective view of an air cleaner device of a second preferred embodiment in accordance with the present invention.

Referring to FIG. 7, an air cleaner device 2a of a second preferred embodiment of the present invention comprises a lower box 7a, an upper cover 6a covering the lower box 7a, four clamp devices 14a disposed on four upper corners of the lower box 7a, and a filter device 10a disposed in the lower box 7a. A connection pipe 3a is connected to the upper cover 6a. An air inlet pipe 5a is connected to the lower box 7a. An air activation block 20a is disposed on the filter device 10a. A large number of square air passages 21a are formed on the air activation block 20a. The air activation block 20a has an ion exchange function for the air. Therefore, the oxygen amount of the air will be increased. The structure of the filter device 10a has been described in the prior art.

The present invention is not limited to the above embodiments but various modification thereof may be made. Furthermore, various changes in form and detail may be made without departing from the scope of the present invention.

I claim:

1. An air cleaner device comprising, in combination:

a lower box, an upper cover covering the lower box, four clamp devices disposed on four upper corners of the lower box, and a filter device disposed in the lower box, a connection pipe connected to the upper cover, an air inlet pipe connected to the lower box, an air activation block providing an ion exchange function for the air, with the air activation block having a first surface disposed on the filter device and a second, opposite surface, and a large number of air passages formed in the air activation block and extending between the first and second surfaces of the air activation block.

2. An air cleaner device as claimed in claim 1, wherein each of the air passages is in a round shape.

3. An air cleaner device as claimed in claim 1, wherein each of the air passages is in a square shape.

* * * * *